US006890230B2

(12) United States Patent
Trujillo et al.

(10) Patent No.: US 6,890,230 B2
(45) Date of Patent: May 10, 2005

(54) METHOD FOR ACTIVATING NANOTUBES AS FIELD EMISSION SOURCES

(75) Inventors: Johann Trujillo, Goleta, CA (US); Albert Alec Talin, Scottsdale, CA (US); Kenneth Andrew Dean, Phoenix, AZ (US); Curtis D. Moyer, Phoenix, AZ (US)

(73) Assignee: Motorola, Inc., Schaumburg, IL (US)

( * ) Notice: Subject to any disclaimer, the term of this patent is extended or adjusted under 35 U.S.C. 154(b) by 432 days.

(21) Appl. No.: 09/940,756

(22) Filed: Aug. 28, 2001

(65) Prior Publication Data

US 2003/0042833 A1 Mar. 6, 2003

(51) Int. Cl.$^7$ .................................................. H01J 9/44

(52) U.S. Cl. ............................................. 445/6; 445/50

(58) Field of Search ........................... 445/6, 24, 25, 445/50, 51; 313/310, 311, 495

(56) References Cited

U.S. PATENT DOCUMENTS

| | | | |
|---|---|---|---|
| 5,773,921 A | 6/1998 | Keesmann et al. | |
| 5,872,422 A | 2/1999 | Xu et al. | |
| 5,949,622 A | 9/1999 | Kamiguchi et al. | |
| 5,986,858 A | 11/1999 | Sato et al. | |
| 6,250,984 B1 * | 6/2001 | Jin et al. | 445/51 |
| 6,514,113 B1 | 2/2003 | Lee et al. | |
| 6,538,367 B1 * | 3/2003 | Choi et al. | 313/309 |

FOREIGN PATENT DOCUMENTS

| | | |
|---|---|---|
| EP | 1069587 A2 | 1/2001 |
| EP | 1022764 | 7/2002 |

OTHER PUBLICATIONS

Xu et al., "A method for fabricating large–area, patterned, carbon nanotube field emitters," Applied Physics Letters, vol. 74, No. 17, Apr. 26, 1999, pp. 2549–2551.

Fan et al., "Self–oriented regular arrays of carbon nanotubes and their field emission properties," Science, vol. 283, Jan. 22, 1999, pp. 512–514.

Suh et al, "Highly ordered two–dimensional carbon nanotube arrays," Applied Physics Letters, vol. 75, No. 14, Oct. 4, 1999, pp. 2047–2049.

Hernadi et al. "Catalytic synthesis of carbon nanotubes using zeolite support," Zeolites 17, 1996, pp. 416–423.

Murakami et al., "Field emission from well–aligned, patterned, carbon nanatube emitters," Applied Physics Letters, vol. 76, No. 13, Mar. 27, 2000, pp. 1776–1778.

Ma et al., "Polymerized carbon nanobells and their field–emission properties," Applied Physics Letters, vol. 75, No. 20, Nov. 15, 1999, pp. 3105–3107.

Li et al, "Highly–ordered carbon nanotube arrays for electronics applications," Applied Physics Letters, vol. 75, No. 3, Jul. 19, 1999, pp. 367–369.

Terrones et al., "Controlled production of aligned–nanotube bundles," Nature, vol. 388, Jul. 3, 1997, pp. 52–55.

Xu et al., "Controlling growth and field emission property of aligned carbon nanotubes on porous silicon substrates," Applied Physics Letters, vol. 75, No. 4, Jul. 26, 1999, pp. 481–483.

(Continued)

Primary Examiner—Joseph Williams
(74) Attorney, Agent, or Firm—William E. Koch

(57) ABSTRACT

A field emission source comprising a first conductive region, a layer of nanotubes deposited on the first conductive region, and a second conductive region placed over and spaced from the nanotube coated first conductive region. After the device structure is fabricated, a laser beam is used to dislodge one end of the nanotube from the first conductive surface and an electric field is simultaneously applied to point the freed end of the nanotube at the second conductive region.

15 Claims, 1 Drawing Sheet

OTHER PUBLICATIONS

Tsai et al., "Bias–enchanced nucleation and growth of the aligned carbon nanotubes with open ends under microwave plasma synthesis," Applied Physics Letters, vol. 24, No. 23, Jun. 7, 1999, pp. 3462–3464.

Kind et al., "Patterned films of nanotubes using microcontact printing of catalysts," Advanced Materials, 11, No. 15, 1999, pp. 1285–1289.

Nilsson et al., "Scanning field emission from patterned carbon nanotube films." Applied Physics Letters, vol. 76. No. 15, Apr. 10, 2000, pp. 2071–2073.

Kuttel et al, "Electron field emission from phase pure nanotube films grown in a methane/hydrogen plasma," Applied Physics Letters, vol. 73, No. 15, Oct. 12, 1998, pp. 2113–2115.

Ren et al., "Synthesis of large arrays of well–aligned carbon nanotubes on glass," Science, vol. 282 Nov. 6, 1998, pp. 1105–1107.

Ren et al. "Growth of a single freestanding multiwall carbon nanotube on each nanonickel dot," Applied Physics Letters, vol. 75, No. 8 Aug. 23, 1999, pp. 1086–1088.

Pan et al., "Very long carbon nanotubes," Nature, vol. 394, Aug. 13, 1998, pp. 631–632.

Zhang et al., "A flat panel display device fabricated by using carbon nanotubes cathode," IEEE, 2001, pp. 193–194.

Zhong et al., "Large–scale well aligned carbon nitride nanotube films: Low temperature growth and electron field emission," Journal of Applied Physics, vol. 89, No. 11, Jun. 1, 2001, pp. 5939–5943.

Kim et al., "Growth and field emission of carbon nanotubes on electroplated Ni catalyst coated on glass substrates," Journal of Applied Physics, vol. 90, Sep. 1, 2001, pp. 2591–2594.

Gulyaev et al., "Field emitter arrays on nanotube carbon structure films," J. Vac.Sci. Technol. B 13(2), Mar/Apr 1995, pp. 435–436.

Chernozatonskii, et al. "Nanotube carbon structure tips—a source of high field emission of electrons," Mat. Res.Soc. Symp. Proc., vol. 359. 1995 Materials Research Society, pp. 99–104.

Su et al., "A scalable CVD method for the synthesis of single–walled carbon nanotubes with high catalyst productivity," Chemical Physics Letters 322, (2000), pp 321–326.

Li et al. "Large–scale synthesis of aligned carbon nanotubes," Science, vol. 274, Dec. 6, 1996, pp. 1701–1703.

Cassell et al. "Large scale CVD synthesis of single–walled carbon nanotubes," J. Phys. Chem. B. 1999, 103, pp. 6484–6492.

Cassell et al. "Directed growth of free–standing single walled carbon nanotubes," J. Am. Chem. Soc. 1999, 121, pp. 7975–7976.

Cassell et al, "Combinatorial optimization of heterogeneous catalysts used in the growth of carbon nanotubes," Langmuir 2001, 17, pp. 260–264.

Li et al, "Large–scale synthesis of aligned carbon nanotubes," Science, vol. 274, Dec. 6, 1996, pp. 1701–1703.

B.H. Fishbine, "Carbon nanotube alignment and manipulation using electrostatic fields," Fullerene Science & Technology, 1996, pp. 87–100.

Cardoso et al. "Influence of Ta antidiffusion barriers on the termal stability of tunnel junctions", Applied Physics Letters,Jun. 19, 2000, pp. 3792–3794.

Sato et al., "Effects of interface oxidation in ferromagnetic tunnel junctions," IEEE, vol. 35, No. 5, Sep. 1999, pp. 2946–2948.

Cardoso et al., "Spin–tunnel–junction thermal stability and interface interdiffusion above 300° C.", Applied Physics Letters, Jan. 31, 2000, pp. 610–612.

Sharma et al. "Determination of barrier oxidation states in spin dependent tunneling structures", Journal of Applied Physics, Jun. 1, 1999, pp. 7803–7806.

* cited by examiner

METHOD FOR ACTIVATING NANOTUBES AS FIELD EMISSION SOURCES

FIELD OF THE INVENTION

This invention relates to field emitters.

More particularly, the present invention relates to using nanotubes as field emission devices in flat panel displays.

BACKGROUND OF THE INVENTION

Electron sources are extremely important in electronic devices used in displays. Display devices include plasma and liquid crystal displays, as well as cathode ray tubes. Cathode ray tubes are bulky and consume a tremendous amount of power in electronic systems. Plasma displays are expensive, have low contrast, and are temperature dependent. Plasma displays also have poor resolution capabilities.

Electron field emitters are becoming increasingly popular for display devices. This is primarily due to the development of cheap and robust field emitters. Field emission involves the extraction of electrons from a solid by tunneling through the surface potential barrier. The emitted current depends directly on the local electric field at the emitting surface and on its work function. This process is typically called Fowler-Nordheim tunneling. Field emission devices typically use a structure commonly known as a Spindt tip for the emitter. However, Spindt tips require a very small size feature to provide the desired emission and control of the emitted electrons. This very small size is extremely difficult to achieve and these tips are prone to serious damage to the tip during high current emission or if it is not uniformly constructed. However, electron field emitters offer better resolution and generate less heat than other technologies currently available.

Nanotubes are one such field emitter that can potentially be used in display technology such as flat panel displays. Nanotubes are excellent electron sources, providing a stable current at very low electric fields and are capable of operating in moderate vacuum. Nanotubes also have low turn-on fields and high current densities.

However, nanotubes need to have uniform field emission over the entire area and need to be properly orientated to achieve useful current densities at low electric fields. Typically, as deposited nanotubes are randomly orientated and adhered in a binder or otherwise adhered to the surface at multiple locations along the length, which makes it impossible to achieve significant and uniform field emission. The field emission is improved by orientating the nanotubes so that one end is attached to the cathode of the device and the second end is pointed at the anode. This is called "activating" the nanotube and increases the likelihood that an emitted electron will reach the anode and subsequently produce an emission current.

Prior methods to reorientate or activate the nanotubes include mechanical brushing or polishing. However, physically contacting the nanotubes tends to spread them to unwanted areas, causing the current to be extracted from undesirable locations. Furthermore, post activation processes, such as wetting during a cleaning step, can cause the nanotubes to lose their orientation and become deactivated.

It would be highly advantageous, therefore, to remedy the foregoing and other deficiencies inherent in the prior art.

Accordingly, it is an object of the present invention to provide a new and improved nanotube field emission device and a method for fabricating such a device.

It is an object of the present invention to provide a new and improved nanotube field emission device with a method that allows the nanotubes to be orientated in a controllable manner.

It is a further object of the present invention to provide a new and improved nanotube field emission device with a method that allows the nanotubes to be orientated after device processing.

It is an object of the present invention to provide a new and improved nanotube field emission device with a method that allows the nanotubes to be orientated without making physical contact with the device structure.

It is another object of the present invention to provide a new and improved nanotube field emission device that requires less power to operate.

A further object of the invention is to provide a new and improved nanotube field emission device with a large field emission current.

SUMMARY OF THE INVENTION

To achieve the objects and advantages specified above and others, a method of fabricating a nanotube field emission device is disclosed which includes providing a supporting substrate, depositing a conductive region on the supporting substrate, depositing a plurality of nanotubes onto the conductive region, and placing a second conductive region over and at a distance from the nanotube coated conductive region. The fabrication technique further includes a method to orientate the plurality of nanotubes so that the first end of a nanotube makes an electrical contact with the conductive region and the second end of the nanotube points towards the second conductive region. This last step is extremely important in the performance and operation of a nanotube field emission device because it increases the likelihood that an electron emitted from the nanotube will reach the second conductive region and thereby cause a tunneling current.

The as deposited, randomly orientated and adhered plurality of nanotubes can be orientated in the desired direction by applying energy to partially dislodge one end of the nanotube from the cathode region. In the preferred embodiment, the energy is supplied by a laser beam incident onto the nanotube coated conductive region. An electric field is simultaneously applied to point the dislodged end of the nanotube in the desired direction. The field emission current is consequently increased because the nanotube is now generally directed towards the anode region and the nanotube is now activated. This also increases the emission site density and decreases the magnitude of the electric field required to achieve a useful level of field emission current. The advantage of this activation method is that it does not require mechanical contact with the substrate, so the nanotubes are not spread to unwanted areas, causing shorts and spurious emission sites. Also, the nanotubes are activated at the last step and will not accidentally be disturbed by further processing. As a result, the performance, power requirements, and yield of the nanotube field emission device is dramatically improved.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the following drawings.

DETAILED DESCRIPTION OF THE PREFERRED EMBODIMENT

Figure 1:
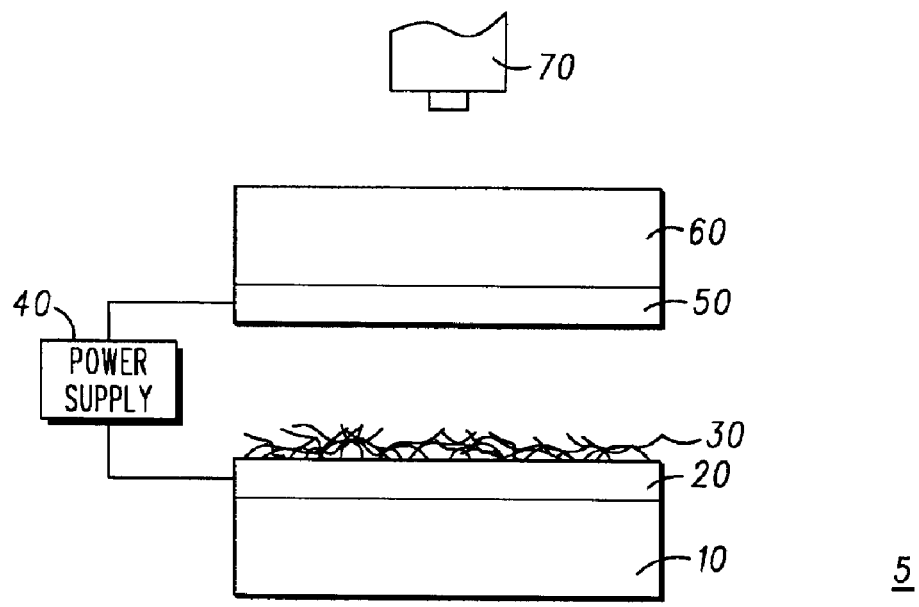
FIG. 1 is a cross sectional view of a nanotube field emission device showing the as deposited nanotubes.

Turn now to the simplified drawing that illustrates a fabricated nanotube field emission device 5, which includes a supporting substrate 10. The supporting substrate 10 is preferably a non-conductive material, such as glass or a ceramic, but it could also be a semiconductor material so as to integrate some control electronics. Also, after the device is fabricated, the supporting substrate 10 can be removed. A conductive layer or layers, hereinafter referred to as conductive region 20, is then deposited onto the supporting substrate 10 and a plurality of nanotubes 30 is deposited onto the conductive region 20. The conductive region 20 serves to act as a portion of a cathode in the field emission device. Generally, conductive region 20 includes a metal that will adhere well to the supporting substrate 10 and on which one or more metal layers can be deposited.

In this preferred embodiment, the plurality of nanotubes 30 consists of carbon nanotubes, but it will be understood that the nanotubes can consist of any material with the desired electrical and physical properties. Nanotubes consist of high aspect ratio structures. In this context, the "aspect ratio" is defined as the ratio of the length of each member to its diameter or width. The plurality of high aspect ratio members generally have an aspect ratio in a range of approximately 500 Å to 100,000 Å length and 10 Å to 1000 Å diameter, with a nominal aspect ratio of approximately 20,000 Å to 10 Å–100 Å. A range is used for the diameter, in the nominal aspect ratio, because of the difficulty in controlling the diameter to a precise number. Because nanotubes are well known in the field and to simplify this disclosure, the high aspect ratio members will hereinafter be referred to generally as nanotubes.

In the step of depositing or positioning the plurality of nanotubes on conductive region 20 a variety of processes may be incorporated to insure that a major portion of the nanotubes extend vertically from conductive region 20. Methods to apply and pattern the nanotubes include dry spraying, wet spraying, growing by means of chemical vapor deposition (herein after referred to as "CVD") and using a seed material, electrophoretic deposition, screen printing, ink-jetting, spin coating, electrostatically printing, etc. In yet another method, the nanotubes can be grown or deposited as a final process step (but prior to providing an anode and vacuum sealing the structure).

Here it should be noted that the nanotubes may vary somewhat in length and the longest nanotubes or the nanotubes extending the closest to an anode (to be discussed) will carry the most current. If the current carried is excessive there generally is some damage to the end of the nanotube, thereby shortening the nanotube. Thus, if the lengths of the nanotubes vary excessively, a short burn-in period could be used to bring the lengths of the nanotubes into conformance so that all or most of the nanotubes emit substantially equally. Also, in a vacuum environment, there is a tendency for a small amount of water to accumulate around each nanotube. This water accumulation reduces the work function of the nanotubes so that they emit electrons at a lower voltage, hence increasing the emitted current at a standard operating voltage. If the current becomes too high, the water is driven off, which increases the work function of the nanotubes so that they emit fewer electrons and the current is reduced.

Screen 60 is placed over and spaced from the nanotube covered conductive region 20. Screen 60 serves to act as an anode in the field emission device. In the preferred embodiment, screen 60 is covered with a conductive region of thin aluminum or indium tin oxide (hereinafter referred to as "ITO") 50. The properties of ITO are well known to those skilled in the art and will not be elaborated upon further. It will be understood that the field emission device used in this illustration contains conductive regions that behave as an anode and a cathode, but there could be other contacts, such as in a field emission triode device. Additional information on one such device is available in U.S. patent application Ser. No. 09/656,912, entitled "Method of Manufacturing Vacuum Gap Dielectric Field Emission Triode And Apparatus", issued Sep. 7, 2000, and incorporated herein by reference. The use of two contacts in this embodiment is to provide a simple illustration of the fabrication method.

The fabrication technique includes a method to orientate the plurality of nanotubes 30 so that the first end of the nanotube makes an electrical contact with conductive region 20 and the second end of the nanotube points towards screen 60. This last step is extremely important in the performance and operation of the nanotube field emission device because it increases the number of electrons collected by the screen 60 and, consequently, increases the field emission current.

Figure 2:
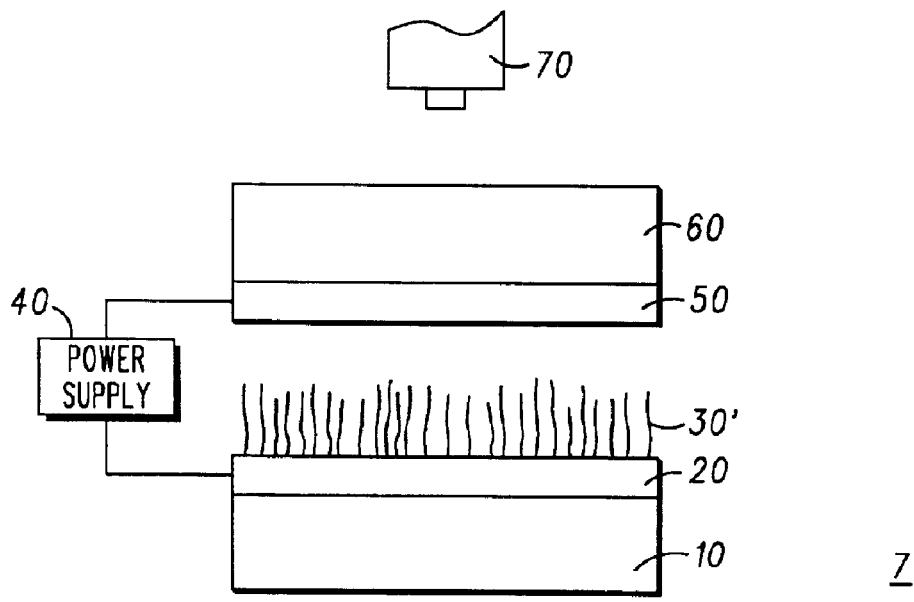
FIG. 2 is a cross sectional view of a nanotube field emission device showing the activated nanotubes.

The as deposited, randomly orientated and embedded plurality of nanotubes 30 can be orientated in the desired direction by applying energy to partially dislodge one end of the nanotube from conductive region 20 and simultaneously applying a directional force to the plurality of nanotubes 30. This is illustrated in FIG. 2 where we show a plurality of activated nanotubes 30'. In the preferred embodiment, the energy is supplied by a laser 70 that supplies a beam which is incident onto the plurality of nanotubes 30. In the preferred embodiment, the beam from laser 70 is directed through the screen 60 and ITO region 50, both of which are optically transparent to the wavelength of the laser. It will be understood that the laser beam could be directed along a different path. It will also be understood that there are other methods that can be used to supply the necessary energy, including ultrasonic energy, thermal energy, or electromagnetic energy (RF, IR, or X-ray). Essentially, what is needed is a surface wave with the correct frequency and energy to dislodge one end of the nanotube from the surface. It is also possible that both ends of the nanotube are adhered to conductive region 20 and the supplied energy could break the nanotube at some point between the two ends. A force is simultaneously applied to the nanotube to point the dislodged end of the nanotube in the desired direction, which in this case is screen 60. In the preferred embodiment, an electric field is supplied by a DC power supply 40 connected between conductive region 20 and conductive region 50. It will be understood that other methods can be used to apply the force to point the nanotubes in the desired direction, including a magnetic field. It will also be understood that an additional electric field can be supplied with a control or gate electrode both with and without the anode, but we illustrate two contacts in this embodiment for simplicity. This method of fabrication can be used in air, vacuum, or a controlled ambient, such as nitrogen or argon. In the preferred embodiment, a laser beam from laser 70 is incident onto the plurality of nanotubes 30, which are initially randomly orientated, and an electric field is simultaneously applied between conductive region 20 and screen conductive region 50. Consequently, the plurality of nanotubes 30 dislodge one end and align themselves with the applied electric field. As a result, the dislodged end of the nanotube becomes orientated in the general direction of conductive region 50. Thus, the nanotubes are electrically orientated without the need for any physical contact.

As a specific example, the laser used to break the adherence operates at a wavelength of 532 nm and uses 6 nsec pulses. The laser power depends on the optical path, but is usually in the range of 5 mJ/cm$^2$ to 500 mJ/cm$^2$. The typical electric field needed to align the nanotubes is about 1 V/$\mu$m. If the anode is spaced 5 mm above the cathode, then the applied anode voltage is 500 V. For a field emission triode device, the gate is typically spaced 10 $\mu$m from the cathode, so 10 V would be needed to achieve an electric field of 1 V/$\mu$m.

The first end of the nanotube connected to the conductive region 20 can be better adhered with a conductive binder. A surfactant may be used during the positioning process to prevent the nanotubes from clumping together. The field emission current is consequently increased because the nanotube is now generally pointed at the anode region. This also increases the emission site density and decreases the magnitude of the electric field required to achieve field emission. The advantage of this activation method is that it does not require mechanical contact with the substrate, so the nanotubes are not spread to unwanted areas, causing shorts and spurious emission sites. Another advantage is that this technique can be used to activate nanotubes in places that would otherwise be physically inaccessible by mechanical contact techniques. Also, the activation of the nanotubes occurs after the device has been processed, so there is no post activation processing steps that can destroy the orientation of the nanotubes. As a result, the performance, power requirements, and yield of the nanotube field emission device is dramatically improved.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A method of fabricating field emission sources comprising the steps of:
    providing a conductive region having a surface;
    depositing elongated emitters onto the surface of the conductive region; and
    electrically orientating the emitters so that a first end of the emitter makes art electrical contact with the conductive region while a second end of the emitter is directed away from the surface of the conductive region, the electrically orientating the emitters step includes:
        releasing adherence between the second end of the emitter and the conductive region; and
        adding wave energy to the conductive region.

2. A method of fabricating field emission sources as claimed in claim 1 wherein the step of providing a conductive region having a surface includes depositing a conductive material onto a supporting substrate.

3. A method of fabricating field emission sources as claimed in claim 1 wherein the step of depositing elongated emitters onto the surface of the cbnductive region includes positioning a plurality of high aspect ratio members.

4. A method of fabricating field emission sources as claimed in claim 3 wherein the step of positioning a plurality of high aspect ratio members onto the surface of the conductive region includes positioning members with an aspect ratio in a range of approximately 500 Å to 100,000 Å length and 10 Å to 1000 Å width.

5. A method of fabricating field emission sources as claimed in claim 4 wherein the step of positioning a plurality of high aspect ratio members onto the surface of the conductive region include positioning one of nanotubes, carbon fibers, nanocrystalline graphite, crushed graphite, and metallic threads.

6. A method of fabricating field emission sources s claimed in claim 3 wherein the step of positioning the plurality of high aspect ratio members includes adhering the high aspect ratio members to the conductive region using a conductive binder.

7. A method of fabricating field emission sources as claimed in claim 3 wherein the step of positioning the plurality of high aspect ratio members includes one of dry spraying, wet spraying growing by means of CVD and using a seed material and electrophoretic deposition.

8. A method of fabricating field emission sources as claimed in claim 1 wherein the step of releasing adherence between the second end of the emitter and the conductive region includes applying a laser beam to the nanotube covered conductive region.

9. A method of fabricating field emission sources as claimed in claim 1 wherein the step of releasing adherence between the second end of the emitter and the conductive region includes using one of an electric field, a magnetic field, and electromagnetic energy.

10. A method of fabricating field emission sources comprising the steps of:
    providing a supporting substrate;
    depositing a first conductive region on the supporting substrate;
    positioning a plurality of emitters onto the first conductive region;
    placing a second conductive region over and spaced from the plurality of emitters; and
    electrically orientating the plurality of emitters, by applying a laser beam to the emitters, subsequent to placing the second conductive region that the first end of the emitter makes an electrical contact with the first conductive region and the second end of the emitter is generally directed towards the second conductive region.

11. A method of fabricating field emission sources comprising the steps of:
    providing a supporting substrate;
    depositing a first conductive region on the supporting substrate;
    positioning a plurality of emitters onto the first conductive region;
    placing a second conductive region over and spaced from the plurality of emitters;
    placing an optically transparent insulator which is coated with indium tin oxide, and
    electrically orientating the plurality of emitters subsequent to placing the second conductive region that the first end of the emitter makes an electrical contact with the first conductive region and the second end of the emitter is generally directed towards the second conductive region.

12. A method of fabricating field emission sources as claimed in claim 10 wherein the step of positioning a plurality of emitters onto the first conductive region includes positioning high aspect ratio members.

13. A method of fabricating field emission sources as claimed in claim 12 wherein the step of positioning high aspect ratio members includes positioning one of nanotubes, carbon fibers, nanocoralline, crushed graphite, and metallic threads.

14. A method of fabricating field emission sources as claimed in claim 12 wherein the step of orientating the plurality of emitters includes applying an electric field between the first and second conductive regions.

15. A method of fabricating field emission sources comprising the steps of:

providing a conductive region having a surface;

depositing elongated emitters onto the surface of the conductive region;

partially dislodging the emitters by applying a laser beam to the emitters and without making mechanical contact with the emitters so that a first end of each of the plurality of emitters makes an electrical contact with the conductive region; and activating the plurality of emitters to direct a second end of each of the emitters away from the surface of the conductive region.

* * * * *

UNITED STATES PATENT AND TRADEMARK OFFICE
CERTIFICATE OF CORRECTION

PATENT NO. : 6,890,230 B2
DATED : May 10, 2001
INVENTOR(S) : Trujillo et al.

It is certified that error appears in the above-identified patent and that said Letters Patent is hereby corrected as shown below:

Column 5,
Line 66, change "cbductive" to -- conductive --.

Column 6,
Line 13, change "s" to -- as --.

Signed and Sealed this

Twenty-seventh Day of December, 2005

JON W. DUDAS
*Director of the United States Patent and Trademark Office*

UNITED STATES PATENT AND TRADEMARK OFFICE
CERTIFICATE OF CORRECTION

PATENT NO.   : 6,890,230 B2
DATED        : May 10, 2005
INVENTOR(S)  : Trujillo et al.

It is certified that error appears in the above-identified patent and that said Letters Patent is hereby corrected as shown below:

Column 5,
Line 66, change "cbductive" to -- conductive --.

Column 6,
Line 13, change "s" to -- as --.

This certificate supersedes Certificate of Correction issued December 27, 2005.

Signed and Sealed this

Twenty-first Day of February, 2006

JON W. DUDAS
*Director of the United States Patent and Trademark Office*